United States Patent [19]

Wey Lin

[11] Patent Number: 5,894,787
[45] Date of Patent: Apr. 20, 1999

[54] ENERGY-EFFICIENT KETTLE

[76] Inventor: Shiow Meei Wey Lin, No. 1258, Jongjeng Road, Tsaotwen Village, Nantour County, Taiwan

[21] Appl. No.: 08/921,741
[22] Filed: Aug. 27, 1997
[51] Int. Cl.$^6$ .............. A23F 3/00; A47J 27/00; B65D 1/00
[52] U.S. Cl. .......... 99/323.3; 99/275; 126/390; 220/602; 220/626; 220/912
[58] Field of Search ................. 99/323.3, 422, 99/447, 275; 126/390, 373, 375; 220/602, 626, 628, 912

[56] References Cited

U.S. PATENT DOCUMENTS

| | | | |
|---|---|---|---|
| 5,135,128 | 8/1992 | Kuhn | 220/912 X |
| 5,396,834 | 3/1995 | Gambini | 128/390 X |
| 5,507,220 | 4/1996 | Jung | 99/422 X |
| 5,711,290 | 1/1998 | Kim | 126/390 |

*Primary Examiner*—Reginald L. Alexander
*Attorney, Agent, or Firm*—Pro-Techtor International Services

[57] ABSTRACT

A kettle has a bottom provided with a heating surface for making a direct contact with a heat source. The heating surface has a plurality of protuberances for increasing the overall heating area of the heating surface, so as to enhance the energy efficiency of the kettle.

5 Claims, 4 Drawing Sheets

ENERGY-EFFICIENT KETTLE

FIELD OF THE INVENTION

The present invention relates generally to a kettle, and more particularly to an energy-efficient kettle.

BACKGROUND OF THE INVENTION

The conventional kettles have a flat and smooth bottom for making contact with a heating device. The conventional kettles are therefore not energy-efficient in view of the fact that the heating area of the flat and smooth bottom is limited, and that the heat conduction of the flat and smooth bottom is not efficient, and further that the flat and smooth bottom allows heat energy to radiate into the air.

SUMMARY OF THE INVENTION

It is therefore the primary objective of the present invention to provide an improved kettle free from the shortcomings of the conventional kettles described above.

In keeping with the principle of the present invention, the foregoing objective of the present invention is attained by a kettle consisting of a bottom which is provided with a plurality of pyramidal protuberances for increasing the overall heating area of the kettle bottom.

The foregoing objective, features, functions, and advantages of the present invention will be more readily understood upon a thoughtful deliberation of the following detailed description of the embodiments of the present invention with reference to the accompanying drawings.

DETAILED DESCRIPTION OF THE EMBODIMENTS

Figure 1:
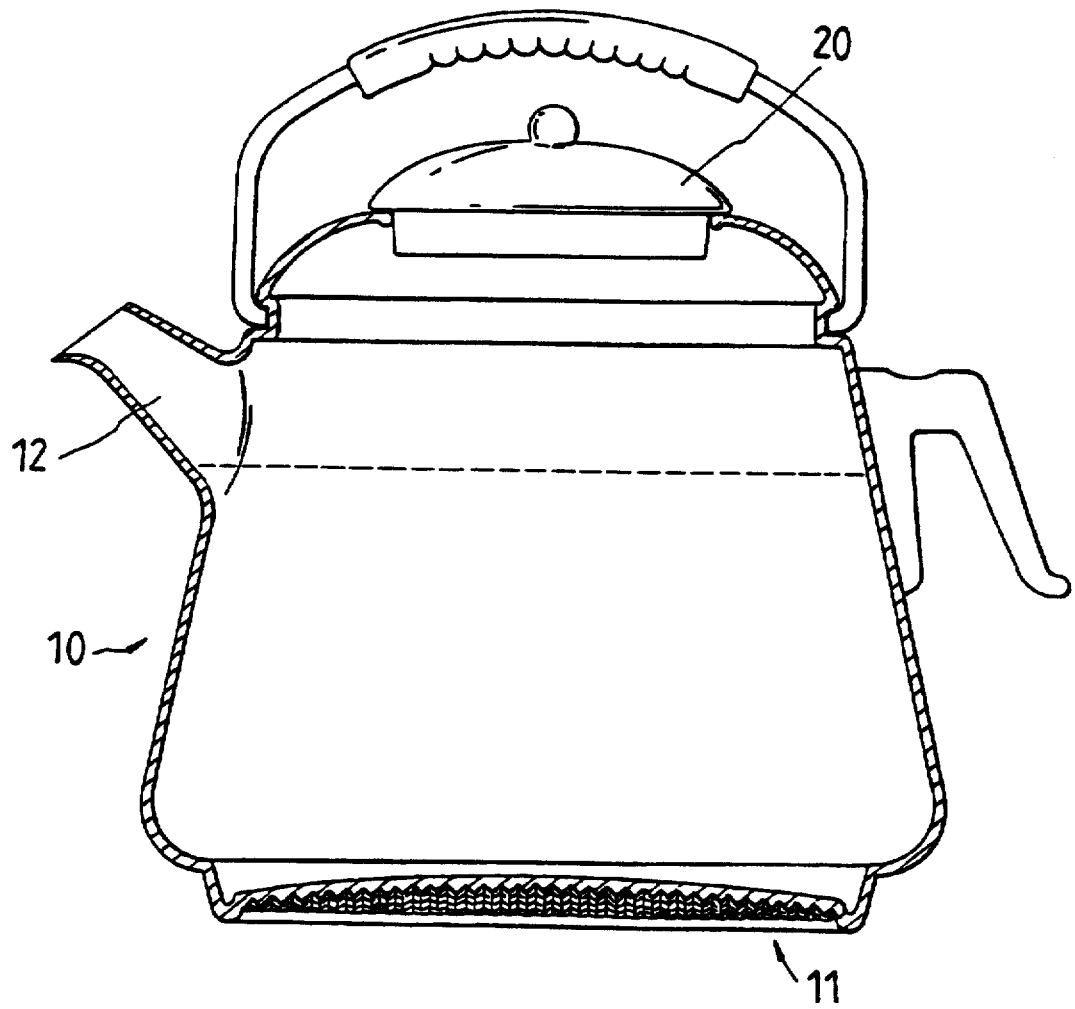
FIG. 1 shows a schematic view of the present invention.
Figure 2:
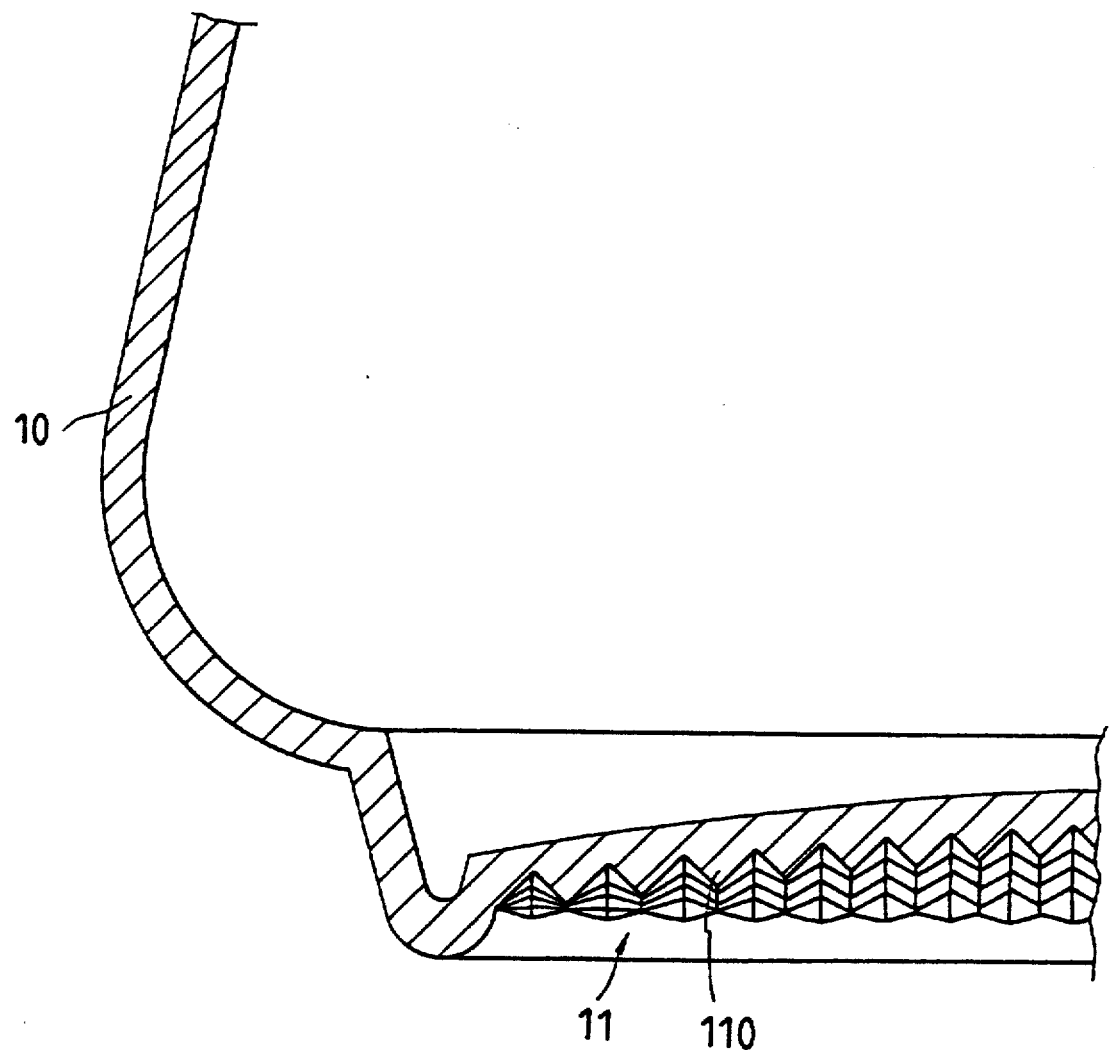
FIG. 2 shows a sectional schematic view of a bottom of the kettle of an embodiment of the present invention.
Figure 3:
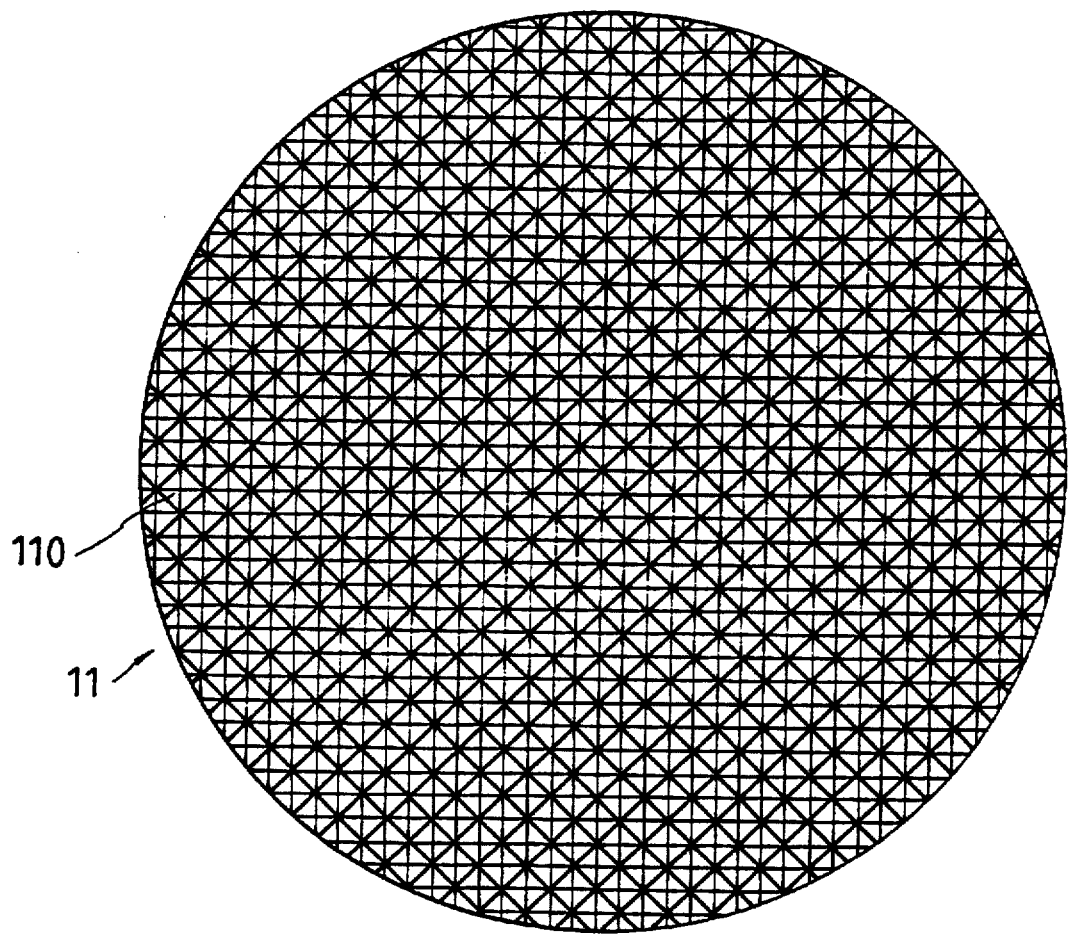
FIG. 3 shows a schematic plan view of the bottom of the kettle of the embodiment of the present invention.

As shown in FIGS. 1-3, a kettle embodied in the present invention has a container 10 and a handle fastened with the container 10. The container 10 is provided with a bottom 11, a spout 12 and a lid 20. The kettle is plated with titanium for producing the mirror effect capable of enhancing the energy efficiency of the kettle by reflecting the heat energy for reuse.

The kettle of the present invention is characterized in design in that the bottom 11 has an underside serving as a heating surface for making a direct contact with heat source. The underside of the bottom 11 is rugged such that it is provided with a number of pyramidal protuberances 110 for enhancing the heating efficiency of the bottom 11 by increasing the overall heating area of the heating surface of the bottom 11. Each of the pyramidal protuberances 110 has a polygonal base. The sides of the polygonal base form the bases of triangular surfaces meeting at a common vertex. The bottom 11 is made of a transparent glass material.

Figure 4:
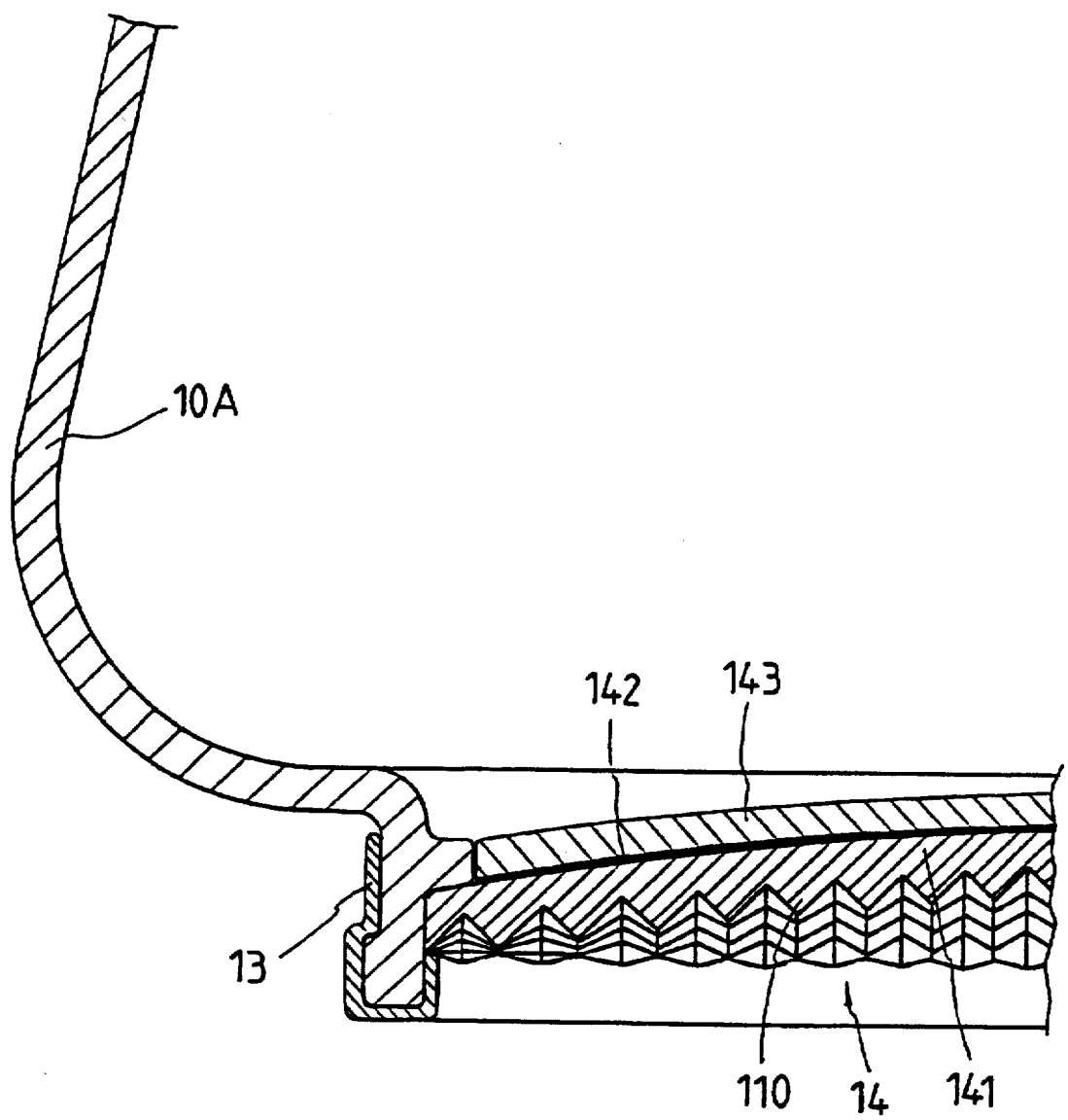
FIG. 4 shows a sectional schematic view of a bottom of the kettle of another embodiment of the present invention.

As shown in FIG. 4, a kettle of another embodiment of the present invention has a container 10A which is provided with a transparent bottom 14 of a glass material. The bottom 14 is provided with a slot for locating a protective frame 13. The bottom 14 is composed of a heating layer 141 and a reinforcing layer 143, which are held together by an adhesive layer 142. The adhesive layer 142 is capable of eliminating the heat stress. The heating layer 141 is provided in the outer surface thereof with a number of pyramidal protuberances 110 for increasing the overall heating area of the heating layer 141 which makes a direct contact with a heat source. Each of the pyramidal protuberances 110 of the heating layer 141 has a polygonal base. The sides of the polygonal base form the bases of triangular surfaces meeting at a common vertex. The container 10A is glazed for producing the mirror effect to enhance the energy efficiency of the kettle by reflecting the heat energy for reuse.

The embodiments of the present invention described above are to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A kettle comprising:

a container and a handle fastened to said container, said container includes a lid, a spout, and a bottom thereof, said bottom includes an underside that serves as a heating surface that makes direct contact with a heat source, said heating surface includes a plurality of protuberances, said protuberances are pyramidal in shape and have a polygonal base having sides forming bases of triangular surfaces which meet at a common vertex.

2. A kettle comprising:

a container and a handle fastened to said container, said container includes a lid, a spout, and a bottom thereof, said bottom includes an underside that serves as a heating surface that makes direct contact with a heat source, said heating surface includes a plurality of protuberances, and said bottom is transparent.

3. A kettle comprising:

a container and a handle fastened to said container, said container includes a lid, a spout, and a bottom thereof, said bottom includes an underside that serves as a heating surface that makes direct contact with a heat source, said heating surface includes a plurality of protuberances, and said bottom includes a reinforcing layer, a heating layer having a plurality of polygonal protuberances, and an adhesive layer located between said reinforcing layer and said heating layer.

4. The kettle as defined in claim 3, wherein said protuberances of said heating layer are pyramidal in shape and have a polygonal base having sides forming bases of triangular surfaces which meet at a common vertex.

5. The kettle as defined in claim 3, wherein said reinforcing layer and said heating layer of said bottom are transparent.

* * * * *